United States Patent [19]

Pierce

[11] Patent Number: 4,863,385

[45] Date of Patent: Sep. 5, 1989

[54] CARDIOPULMONARY RESUSCITATION (CPR) SEQUENCER

[76] Inventor: Richard S. Pierce, 4006 Calle Bienvenido, San Clemente, Calif. 92672

[21] Appl. No.: 474

[22] Filed: Jan. 5, 1987

[51] Int. Cl.⁴ .................. G09B 23/28; A61H 31/00
[52] U.S. Cl. ..................................... 434/265; 128/28
[58] Field of Search .............. 434/265, 262, 307, 428; 128/419 D, 28

[56] References Cited

U.S. PATENT DOCUMENTS 4,583,524  4/1986  Hutchins ........................... 434/262
4,588,383  5/1986  Parker et al. ..................... 434/265

Primary Examiner—Theodore M. Blum
Assistant Examiner—Gregory C. Issing

[57] ABSTRACT

A compact, portable, computer controlled device which provides timing and sequence guidance for helping the CPR rescuer remember what actions are required, and when the associated tasks need to be performed. The rescuer can select the correct logic for infant, child, or adult and can indicate whether the rescue is being performed by one or two people. Audible buzzers, synthetic voices, and indicator lamps guide the rescuer in the performance of CPR. In addition, the device to provides variable pacing rates for when a pulse is present and only artificial ventilation is required. It is a device that works equally as well in the training environment as well as in support of CPR during an actual emergency.

6 Claims, 12 Drawing Sheets

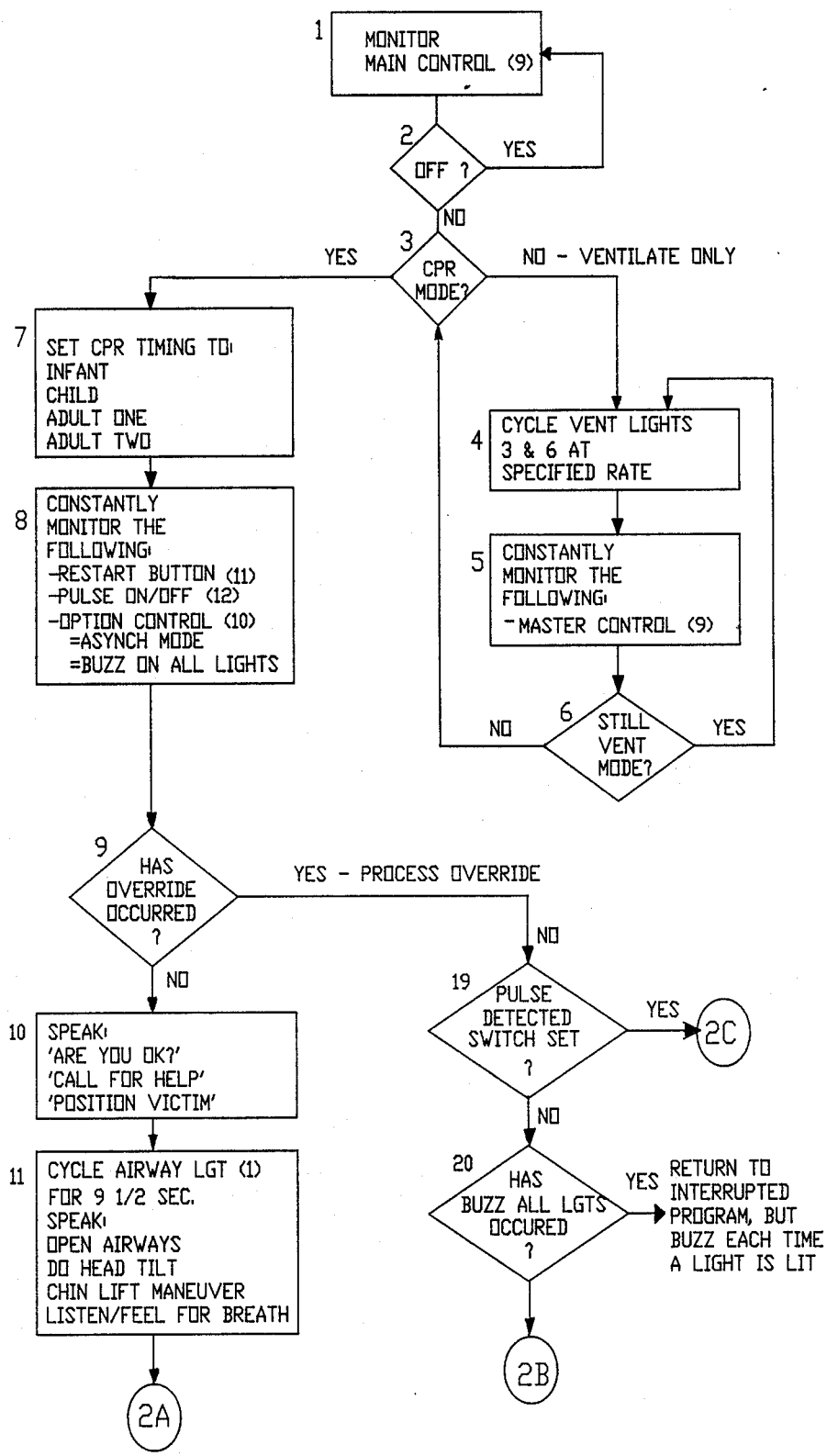
Figure 2 (PART 1)

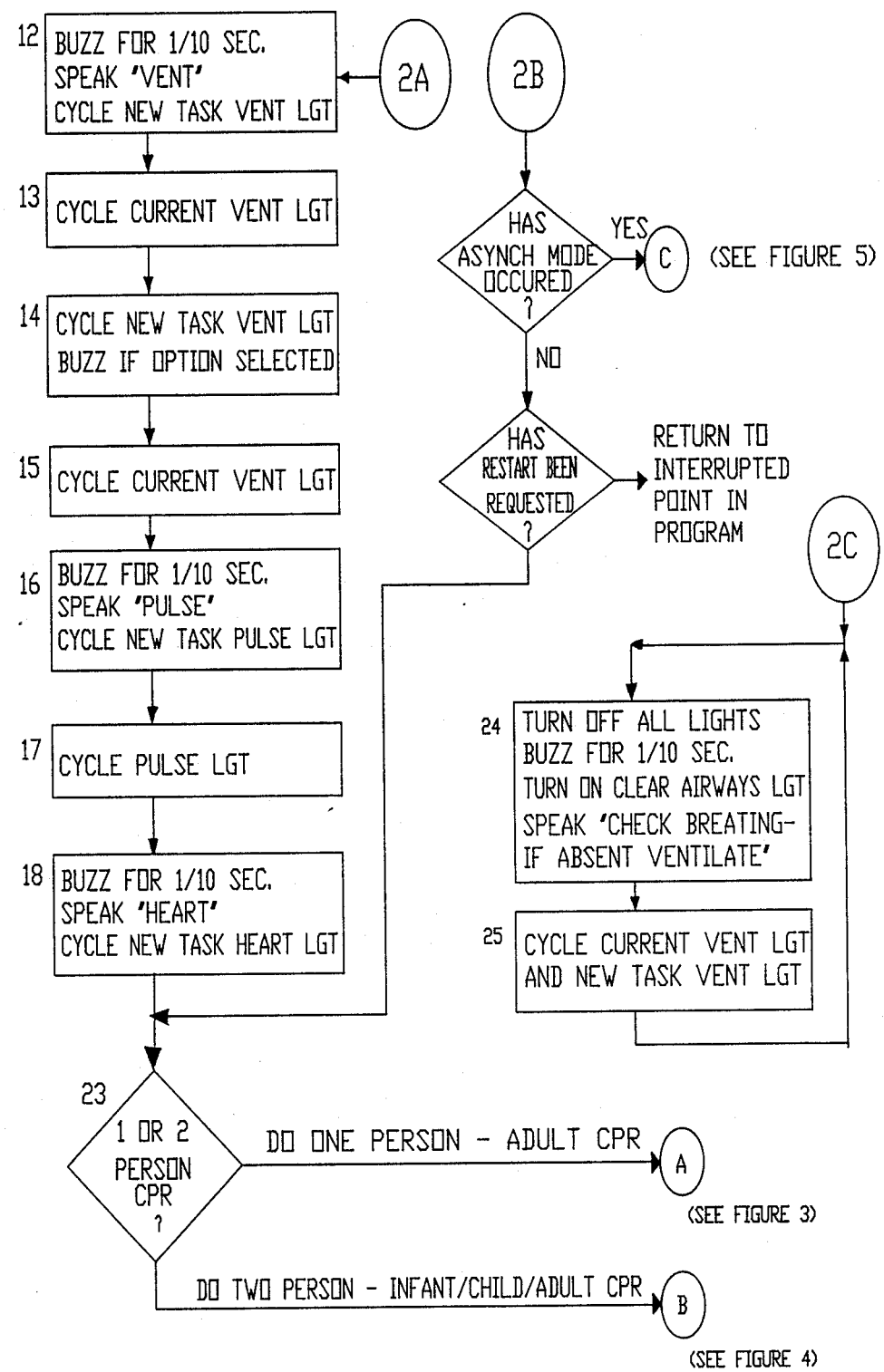
Figure 2 (PART 2)

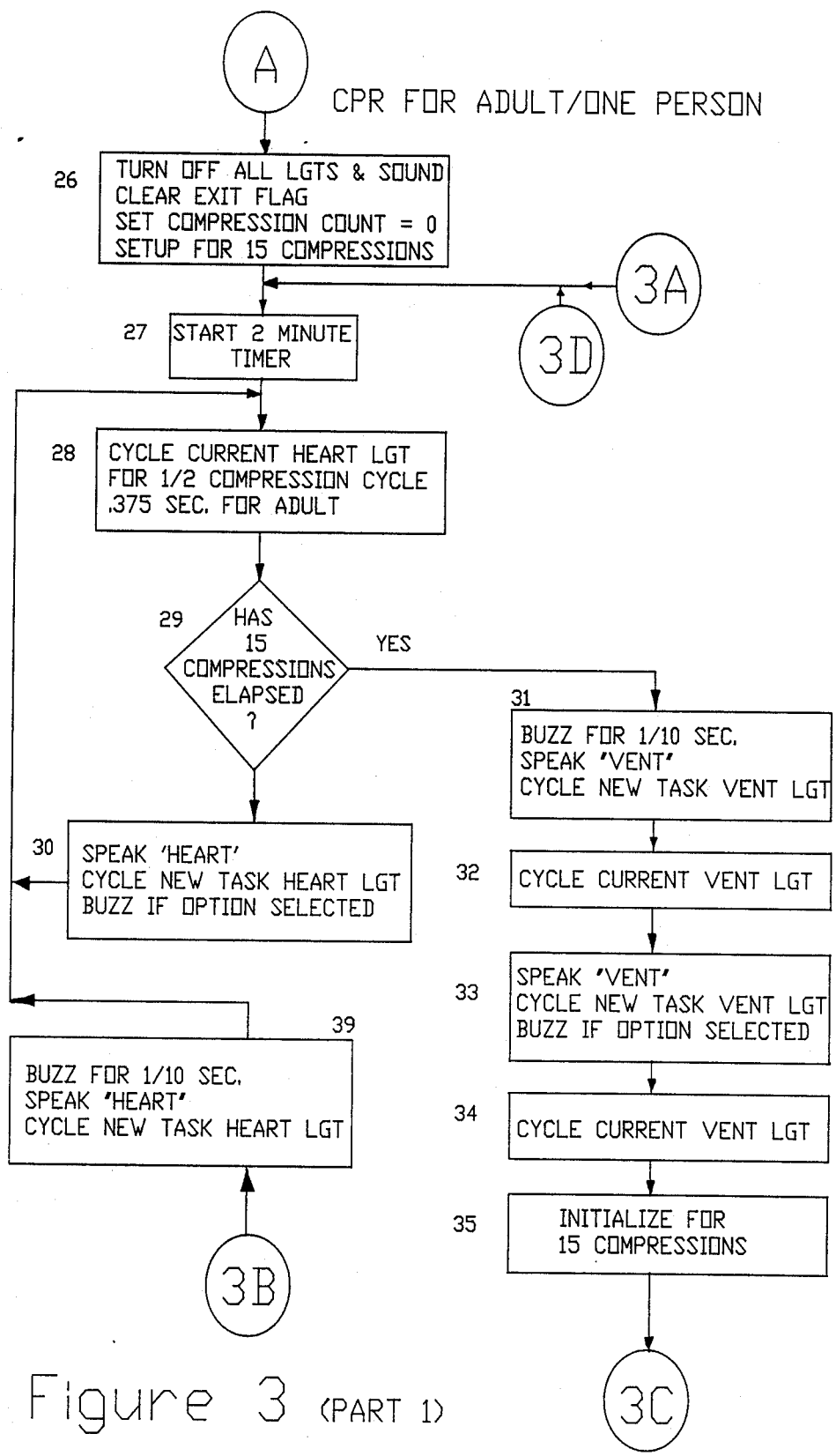
Figure 3 (PART 1)

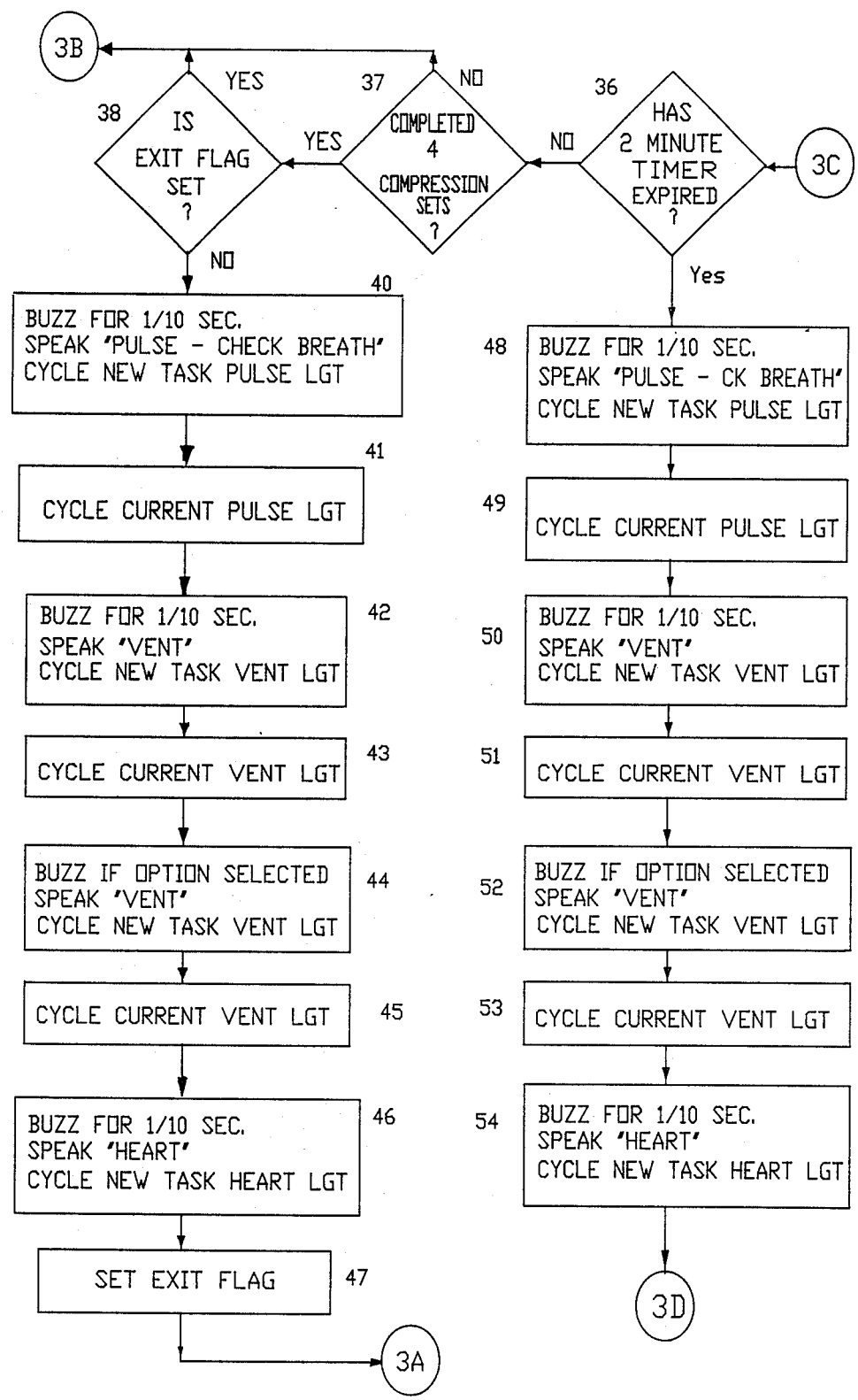
Figure 3 (PART 2)

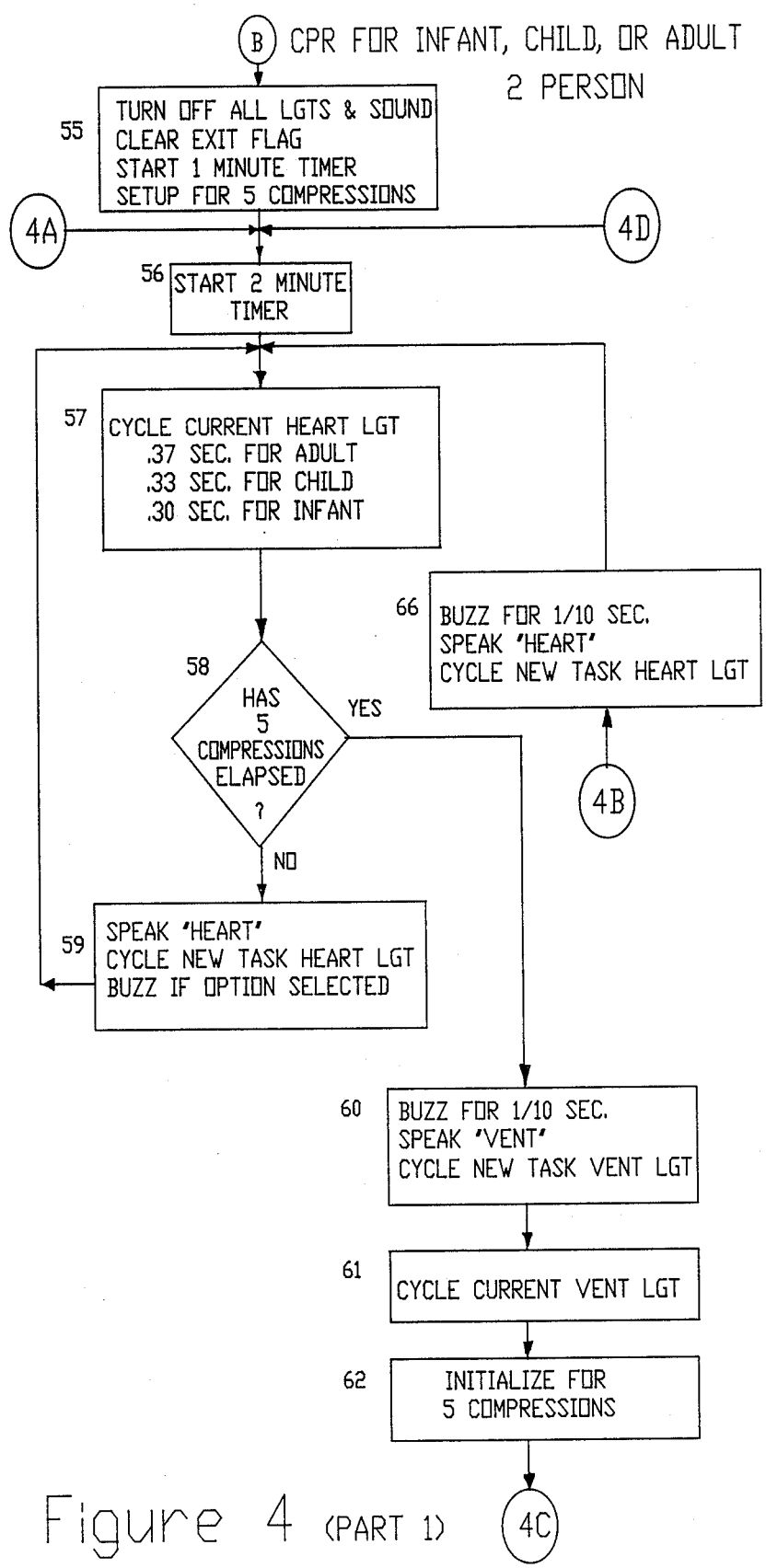
Figure 4 (PART 1)

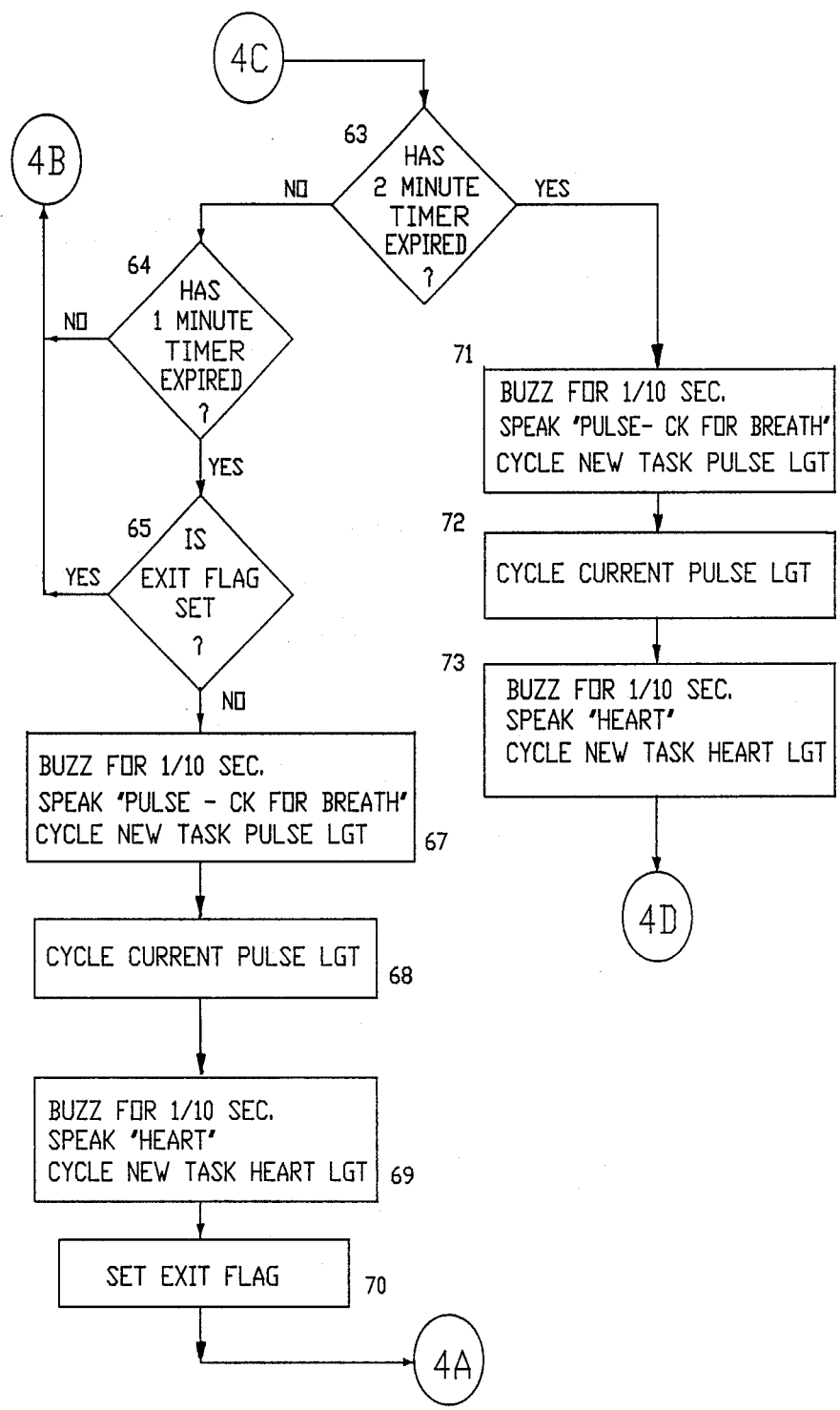
Figure 4 (PART 2)

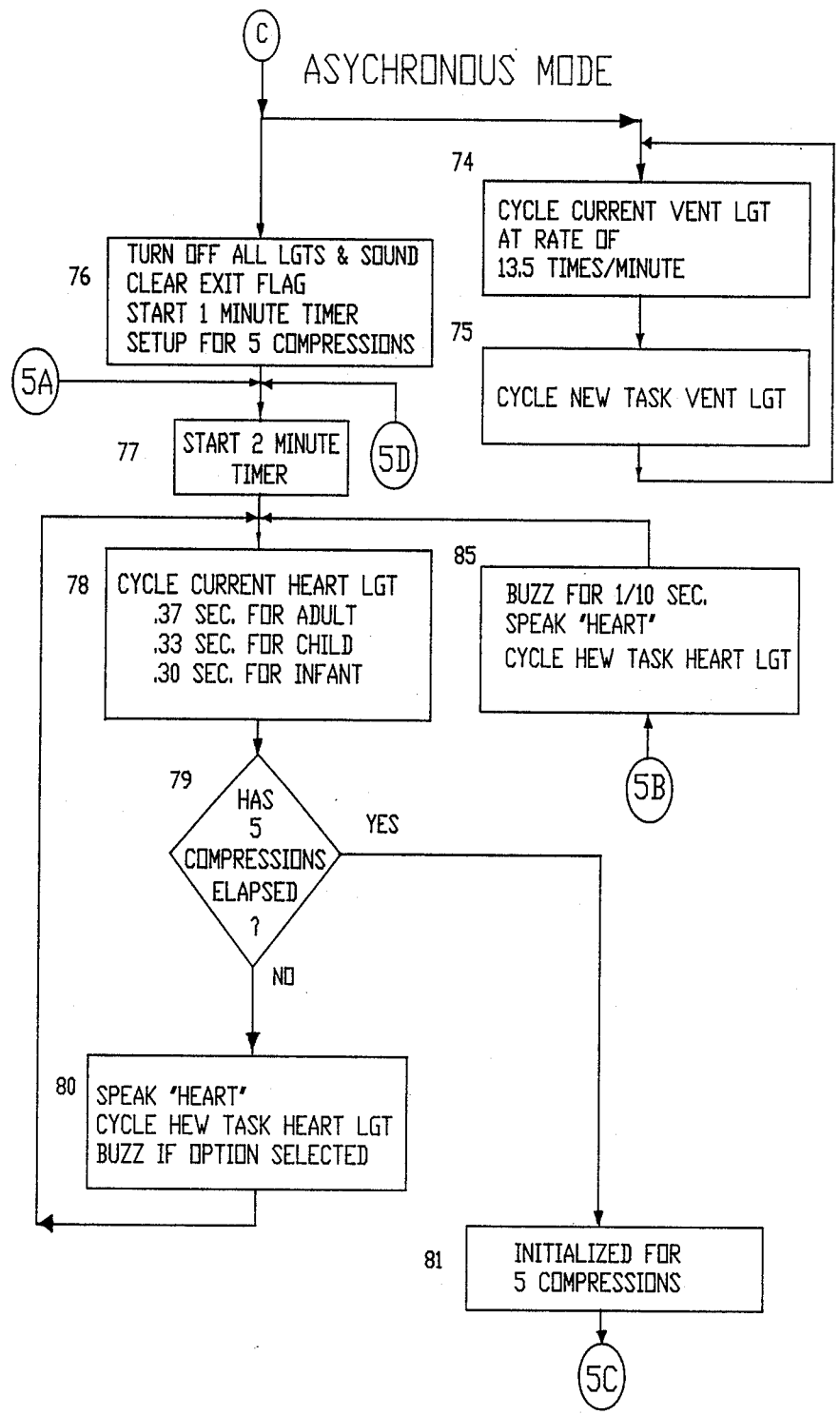
Figure 5 (PART 1)

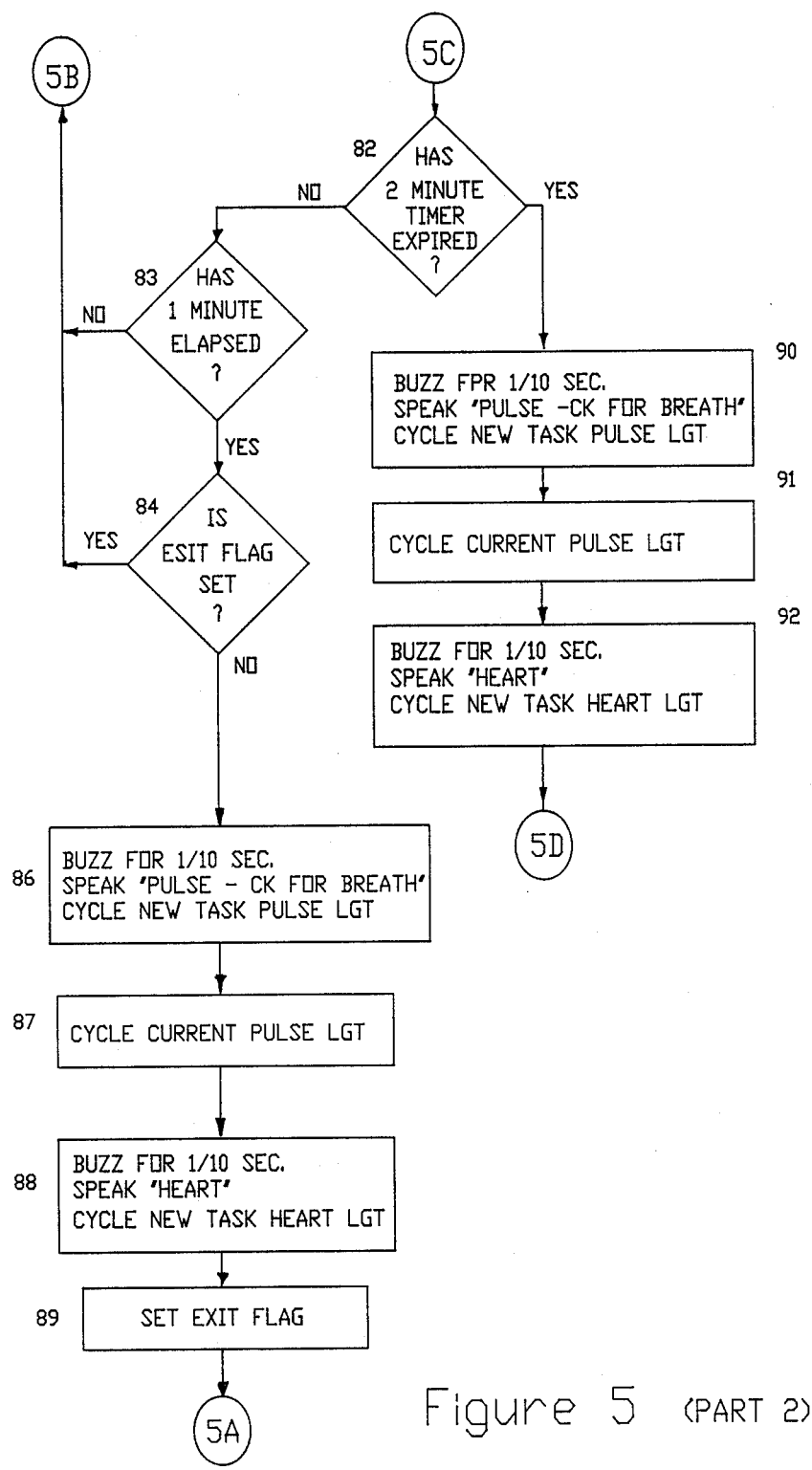
Figure 5 (PART 2)

4,863,385

CARDIOPULMONARY RESUSCITATION (CPR) SEQUENCER

BACKGROUND OF THE INVENTION

This invention is a portable computer controlled electronic sequencer that leads the rescuer, in a timed manner, through a selected Cardiopulmonary Resuscitation (CPR) process. It can assist in either CPR or straight ventilation, where the victim's heart is beating but oxygen must be forced into the lungs. It is an easily portable, reasonably priced, non-invasive device which can guide the rescuer in all possible CPR applications. Besides being a device that improves the actual application of CPR, it is a major new learning aid which can provide the best possible assistance in the teaching of CPR.

CPR training is taught to professional medical personnel, who use it often, as well to non medical people who may never have the occasion to use the technique. Training is common for both groups, and, such training will be enhanced by this invention. After learning with this device, it can be taken with the trainee to locations where an actual CPR need may exist.

Lay people forget the timing and sequencing of events after a short time and need the guidance this feature provides; and the professional can use timing and sequencing assistance to ease the stress of their work. The professional can also use the "ventilation only" aspect of this device, with its multiple pacing feature, for non CPR or follow on CPR applications.

Family members of elderly stroke and heart attack patients should have this device in their homes, cars, and offices to assist if the need for CPR should arise. Owners of swimming pools should also have this unit available in case of a near-drowning.

The following prior U.S. patents relating to this general field constitute all of the prior art known to the applicant. These patents were located through a novelty search made relative to applicant's invention and are as follows: U.S. Pat. Nos. 1,918,041 to Knapke; 4,095,590 to Harrigan; 4,196,725 to Gunderson; and 4,360,345 to Hon.

Of the list of patents, none were designed to support both training and actual field usage. U.S. Pat. No. 4,095,590 provides a counter to record the history of how many times a chest compression was performed. This is of no assistance to the rescuer. All of the other three patents provide some means of indicating rhythm or pacing to the rescuer. U.S. Pat. No. 1,918,041 provides a visual or audible rhythm indication at either 15 or 30 times per minute. This helps to support the "prone method" of artificial respiration. U.S. Pat. No. 4,196,725 provides an audible signal at the rate of 60 or 80 times per minute. U.S. Pat. Nos. 4,095,590, 1,918,041, and 4,196,725 only indicate the timing for heart compression, and do not provide the required timing for other CPR tasks such as ventilation and monitoring of the pulse. Besides not providing for all the timing requirements needed, they do not indicate the different tasks to be performed. Only U.S. Pat. No. 4,360,345 provides logic assistance as to the CPR steps that need to be taken, and that device is a system composed of a television type display, video disc, computer, and mannequin. This system is not portable and is useful only for training purposes, not with a victim.

There is no device that provides logical, timed guidance for the actual CPR task, which also can function equally well in the training environment as well as in field applications. The best system is a device that people can learn on and that can also be used in actual situations.

SUMMARY OF THE INVENTION

This invention uses a microprocessor to monitor inputs from the rescuer and to provide stimuli for guiding the rescuer through any of the possible CPR processes. It is highly accurate and has low power requirements. Since all functions are controlled by computer software, it is flexible to changes that may be subsequently adopted in the CPR field. Being portable, this device also works equally well in the class room as in the field with a real victim.

The device relies primarily on a set of "Current Task" lamps which flash on and off indicating what should be currently in process for the CPR situation selected (e.g. compression versus ventilation). In addition, a buzzer, synthetic voice commands, and separate "New Task" lamps are used to alert the rescuer that the current task is about to change. At such time that the buzzer sounds to indicate a new task, the appropriate "New Task" light flashes on to identify the next job to be performed. The "Current Task" indicator lamps identify the following tasks:

Clear Airways
Ventilate Between Compressions
Compress Heart
Take Pulse

"New Task" indicator lamps exist for the following situations:

Start Ventilation
Start Heart Compressions
Start Monitoring the Pulse

A separate Pulse Detected lamp is also available for incorporating an external pulse sensor which the rescuer has the option to use.

The specific times and tasks currently specified for this device were taken from the Standards and Guidelines for Cardiopulmonary Resuscitation and Emergency Cardiac Care reprinted from "The Journal of the American Medical Association", June 6, 1986, Volume 255, Number 21, Pages 2841-3044, Copyright 1986, American Medical Association. The rescuer has control switches to allow selection of the correct logic to meet any CPR situation. In addition the rescuer can indicate that the device should synchronize itself with the patient situation by restarting the heart compression cycle, or that a pulse is present and CPR should be stopped so that a proper ventilation cycle can be started. A separate "Ventilation Only" mode is available to pace the rate that ventilation air is administered to the patient. Lastly, where is an option which allows for an "asynchronous mode" where the ventilation cycle is no longer synchronized with chest compressions and pulse checking cycles.

BRIEF DESCRIPTION OF THE DRAWINGS

FIG. 2 is a summary of the initial logic capabilities of this device showing start up logic and the logic for continually monitoring for any changes in the selection of CPR criteria which are input by the rescuer.

FIG. 3 is a continuation of FIG. 2 showing the logic applied for one person performing Adult CPR.

FIG. 4 is a continuation of FIG. 2 showing the logic applied for one person doing either Infant or Child CPR, or for two persons doing Adult CPR.

FIG. 5 is a continuation of FIG. 2 showing the logic applied for the Asynchronous Mode.

DETAILED DESCRIPTION OF SPECIFIC EMBODIMENTS

General

Figure 1:
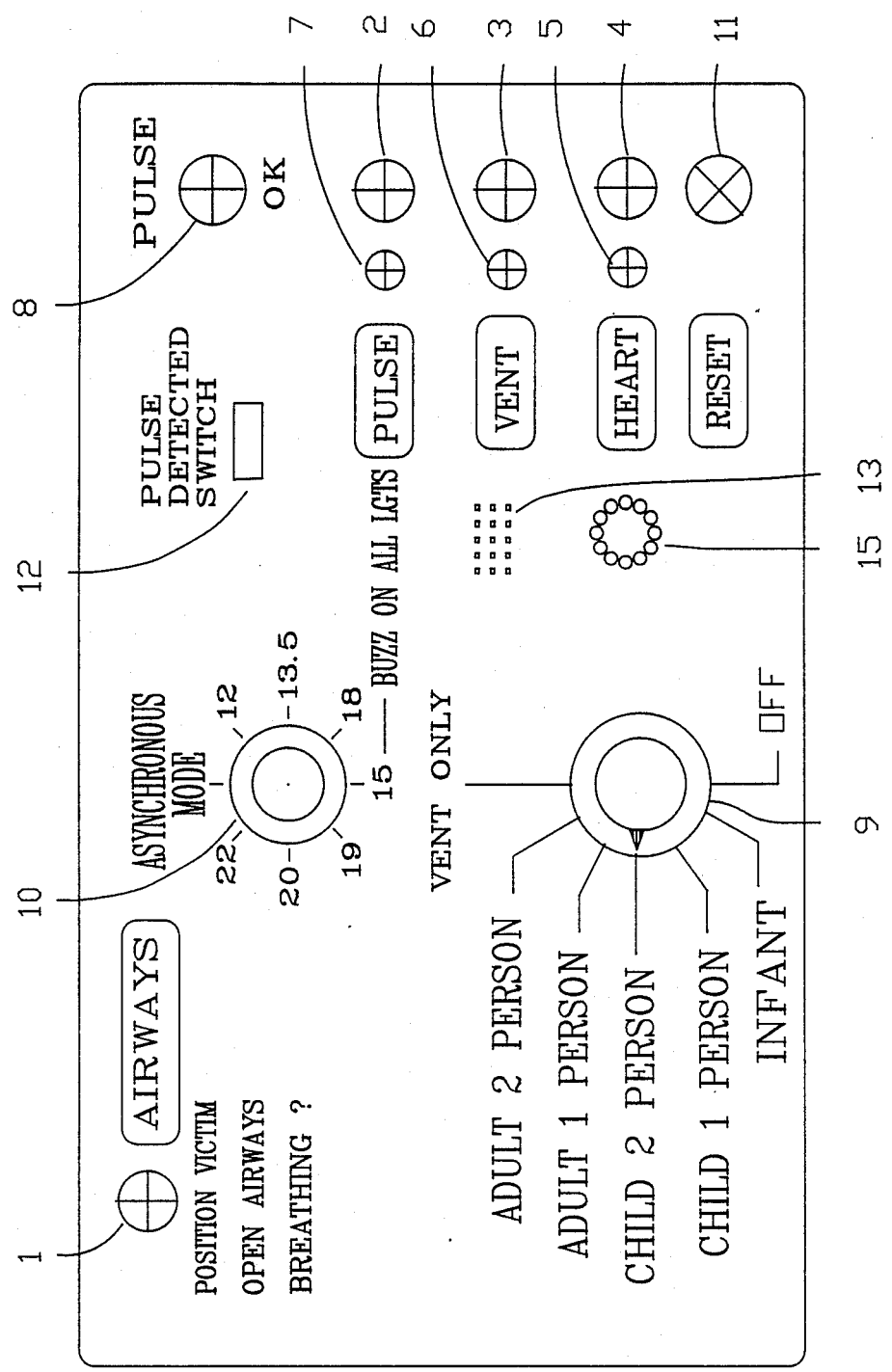
FIG. 1 is a plan view of the CPR Sequencer showing the control selection switches, the "Current Task" indicator lamps, the "New Task" indicator lamps, the buzzer, the voice output speaker, and the pulse sensor "Pulse OK" input light.

This inventions is a portable unit which enhances training and which provides logic to give a timed, sequenced reminder of what to be when faced with CPR.

From a timing sense, this device improves upon the standard counting approach promoted in CPR training. Because of the need to easily count at a given pace, the current manual approach uses only two different heart compression rates for three different situations. These rates are 80 times per minute for adults and 100 times per minute for children and infants. This device more accurately provides three pacing time rates of 80 times per minute for adults (0.75 sec./compression), 90 times per minute for children (0.66 sec./compression), and 100 times per minute for infants (0.60 sec./compression). This extra time interval for the child has yet to be approved by the American Heart Association; however, they currently do recommend using the compression rates from 80 to 100. The actual rates and number of cycles for each of the basic CPR victim/rescuer configurations are as follows:

| CONFIGURATION | RATE | #COMPRESSIONS |
|---|---|---|
| 1 Person Adult | 80/min | 15 |
| 2 Person Adult | 80/min | 5 |
| 1 Person Child | 90/min | 5 |
| 1 Person Infant | 100/min | 5 |

In CPR, once the heart compression cycle starts there is a basic repeat cycle which is as follows:

a. Compress heart appropriate number of times at the rate needed for adult, child, or infant.

b. Ventilate once or twice for 1.5 seconds each time. (Two ventilations are only used in the case of "1 Person Adult" CPR.)

c. Repeat steps "a and b for approximately one minute and then pause for 5 seconds to allow the time to take the pulse and determine if the victim has resumed spontaneous breathing.

e. In the case of 1 Person Adult CPR two more ventilations are administered after checking the pulse.

f. Repeat all of the above steps starting at "a" but provide for taking the pulse and monitoring breathing only every 2 minutes.

g. If a pulse is ever detected check for breathing for 4 seconds. If breathing is absent ventilate at a rate of 12 times per minute or use a faster rate if the airway has been protected by placement of an esophageal obturator airway or endotracheal tube.

This device is designed for use in actual rescue as well as training situations and can be packaged in more than one configuration. Specifically, this sequencer can be packaged as a smaller unit by deleting the "ventilation only" and "asynchronous mode" options and allowing it to only support standard CPR. Further simplification, miniaturization, and cost reduction are made possible by deleting the voice synthesizer, pulse detected light and input port for the pulse. This units' power source can also be miniaturized for portability or enlarged with recharging circuits to support primary usage in a training environment. In its full configuration, it provides redundant type sequence guidance both as an additional aid in conducting the rescue operation and as a back-up in case any of the visual or audible indicators fail and a degraded mode of operation is required.

There is a variable tone buzzer which the rescuer can choose to have sound either each time a basic task light is lit, or only just before a change occurs as indicated by "Current Task" lights.

Master Control Switch

The device allows the rescuer to specify the victim/rescuer situation. The Master Selector switch 9 is the switch which allows the rescuer to choose the proper application for use in CPR or to choose ventilate only. Switch positions are as follows:
OFF
ON—1 PERSON INFANT CPR
ON—1 PERSON CHILD CPR
ON—1 PERSON ADULT CPR
ON—2 PERSON ADULT CPR
ON VENTILATE ONLY

Display Lights

This unit uses four multiple colored basic "Current Task" indicator lamps 1,2,3, and 4 in FIG. 1 and synthetic voice commands to indicate that the rescuer is to do one of the following:

| a. | AIRWAY- Start to clear the airway | 1 |
|---|---|---|
| b. | PULSE- Start to take a pulse | 2 |
| c. | VENT- Start to ventilate the patient | 3 |
| d. | HEART- Start to compress the heart | 4 |

In addition, three smaller "New Task" indicator lamps shown by 5,6, and 7 are used to tell the rescuer the next task or procedure to occur. These lamps are lit one half second or one half cycle (which ever is shorter) before the end of the last current task. These lamps exist for the following:

| a. | HEART- About to start compression of the heart | 5 |
|---|---|---|
| b. | PULSE- About to start taking a pulse | 7 |
| c. | VENT- About to start ventilating the patient | 6 |

Restart Switch

A Restart Button 11 is provided to allow flexibility of use. At any time, the rescuer can press this button and the device will start the heart compression cycle for the defined CPR situation. Someone with this unit may come upon a rescuer already performing CPR and this switch allows this unit to "get in sync with the ongoing rescue". This is done by selecting the appropriate situation using the Main Control switch 9, and then simply pressing the Restart button 11 at the time the heart compression cycle is started with the victim. This same button can be used if for some reason "Taking the Pulse" requires more time than this device allows or any other task (e.g., calling for help) is performed. To get in sync again, the rescuer simply presses this Restart button 11 and starts heart compressions.

Pulse Detected Switch

When, in absence of a heart compression, a pulse is either manually detected or is detected via the remote pulse sensor, the rescuer should set the Pulse Detected switch 12. Setting this switch causes the device to stop the current CPR cycle and to automatically switch to a "Ventilate Only" cycle of 12 times per minute. If for some reason the pulse is later lost and CPR needs to resume, the rescuer simply turns off the Pulse Detected switch 12 and presses the Restart button 11.

Pulse OK Lamp

A Pulse OK light 8 is provided to monitor the quality of the CPR being administered. This lamp indicates when a pulse is automatically detected for the victim. A commercially available pulse sensor unit is attached via input port 14 and when a pulse is detected the Pulse OK lamp 8 lights. Each time a proper chest compression is administered an artificial pulse is generated in the patient and the Pulse OK lamp 8 lights. Thus the device indirectly monitors whether the pressure applied by the CPR compression act is adequate. Further, if a real pulse has been started, then the Pulse OK lamp 8 will also light during the "pulse monitor" or "ventilation" phase when compressions have stopped. Of course if this occurs the rescuer should set the Pulse Detected switch 12.

Option Control Switch

The Options Control switch 10 is used to select one of two CPR options (asynchronous mode or buzz on all lights), or a desired ventilation rate (i.e. if the Main Control switch 9 is in Ventilate Only, then the Options Control switch 10 is used to select one of seven different ventilation rates.). The options available are as follows:
ASYNCHRONOUS MODE
VENTILATE 22 TIMES PER MINUTE
VENTILATE 20 TIMES PER MINUTE
VENTILATE 19 TIMES PER MINUTE
VENTILATE 18 TIMES PER MINUTE
VENTILATE 15 TIMES PER MINUTE (BUZZ ON ALL LIGHTS) **
VENTILATE 13.5 TIMES PER MINUTE
VENTILATE 12 TIMES PER MINUTE 6 This switch position has two independent purposes: the selection of a ventilation rate of 18 times per minute or the option to buzz prior to when lights 2, 3, or 4 are lit.
This switch position has two independent purposes: the selection of a ventilation rate of 18 times per minute or the option to buzz prior to when lights 2,3, or 4 are lit.

This range of times covers the most common rates doctors might ask for when working on a patient in an emergency situation. This device automatically provides a rate of 12 per minute when the Pulse Detected switch 12 is set causing the device to automatically change to Ventilate Only. Other rates are available for doctor usage only.

(Ventilate Only)

When in Ventilate Only mode, the "Current Task" Vent lamp 3 and the "New Task" Vent indicator lamp 6 are cycled on and off together at the rate indicated by the Options Control switch 10. The buzzer is not sounded.

In the follow on CPR mode (after the Pulse Detected switch 12 is set), if ventilations of a rate other than 12 are desired, the Main Control switch 9 is set to Ventilate Only and the Option Control switch 10 is set at the desired rate.

(Buzz on all lights)

If the Main Control switch 9 is set to select one of the four CPR types and the Options Control switch 10 is set to "(Buzz on all lights)", then the buzzer is sounded prior to every time the Heart 4, Vent 3, or Pulse 2 lamp is lit. When set to "Buzz on all lights", the Option Switch 10 serves as a buzzer on/off control. The buzzer output speaker is indicated by part 15 and is programmed to have different tones so that the unique sound itself is an indication of the need to change tasks as well as which task needs to be performed next. Each short tone is followed by one or more words from the voice synthesizer for positive guidance. The voice speaker is indicated by part 13.

(Asynchronous Mode)

If switch 10 is not set to "buzz on all lights", the buzzer will sound only when a different procedure is coming up and this allows the rescuer to prepare to switch tasks (i.e., from compression to ventilation). The buzzer sounds one half second or one half of a cycle (whichever is shorter) before a new task is to be performed (compression, ventilation, or pulse), and the appropriate small "New Task" indicator lamp lights up. This is immediately followed by a voice command of Heart, Vent, or Pulse. The rescuer is thus warned that his current task is ending; and if his memory fails or noise inhibits hearing the voice, the device visually identifies the next task. If the Main Control switch 9 is set to one of the four CPR selections and the Options Control switch 10 is set to Asynchronous Mode, the ventilation lamps 3 and 6 will alternately cycle independent of the Heart 4 and 5 lights, and the Pulse 2 and 7 lights. When this mode is used, it is because an esophageal obturator airway or endotracheal tube has been inserted into the patients throat. In this mode, the Vent light 3 will flash at 13.5 times per minute while the CPR Heart light 4 and Pulse light 2 will continue to cycle as required by the CPR option selected. In this configuration, the buzzer and synthetic voice will indicate when a Heart compression or a Pulse detection task is required and will not sound to indicate a ventilation task.

Logic Figure Review

A complete review of the logic is found in FIGS. 2,3,4 and 5. The logical process is as follows:

In FIG. 2, boxes 1 and 2 indicate that the computer is constantly running and checking whether the rescuer has switched out of the "OFF" state. Box 3 determines if the Ventilate Only option was selected or one of the four CPR modes (Infant, Child, Adult 1, or Adult 2) were chosen (Main Control swtich 9).

If the "Ventilate Only" option was selected, the logic proceeds on to box 4 where it indicates that both "Current Task" Vent lamp 3 and "New Task " vent indicator lamp 6 are cycled on and off together at the rate selected on the alternate Options Control switch 10. Box 5 indicates that the logic is constantly monitoring the Master Control switch 9 so that if the rescuer switches out of "Ventilate Only", the device will follow the logic of the new selection. Box 6 is a test of the monitored Switch 9 position. The logic returns to box 4 to continue "Ventilate Only" or exits and moves on to box 7 if a CPR mode is selected.

When a CPR mode is selected, the logic in box 7 determines the appropriate timing for the type of CPR as follows:
Infant set rate to 100 heart compressions/minute
Child set rate to 90 heart compressions/minute
Adult 1 or 2, set rate to 80 heart compressions minute
Boxes 8 and 9 indicate general override logic that is operating at all times. If at any time in the CPR process the rescuer changes a switch setting, this box will detect that occurrence and existing logic is stopped and processing flows to box 19, 20, 21, or 22.

If no override occurs, processing continues with box 10. Box 10 causes the device to speak the following commands:
Ask: Are you ok?
Call for help.
Position victim
Following these spoken commands box 11 causes the Clear Airways Lamp 1 lights for 9½ seconds, so that the rescuer can determine breathlessness by listening for and feeling for the flow of air. While lamp 1 is lit the following words are spoken:
Open airways
Do Head tilt chin lift maneuver
Listen, feel for breath
Next, in boxes 12 to 18, the Ventilate Lamp 3 is cycled twice, and then the Pulse Lamp 2 is cycled. When this procedure is over, the heart compression cycle starts. Box 12 indicates that the buzzer is sounded with a "vent sound" followed by the spoken word "Vent" and the New Task Vent light 6 is lit for ½ second. Box 13 indicates that the Current Task Vent light 3 is lit for 1 second then turned off. The logic in box 14 completes this 1½ second vent cycle by indicating another vent cycle is about to begin. This is done by the New Task Vent light 6 being lit for a ½ second. If the "Buzz on all lights" option is selected with switch 10, then the buzzer is again sounded. Box 15 indicates that the Current Task Vent light 3 is again lit for 1 second and then turned off. This is followed by box 16, where the buzzer is sounded, the word "Pulse" is spoken, and the New Task Pulse light 7 is lit. In box 17, the Current Task Pulse light 2 is lit for 4.5 seconds then is turned off. Next, in box 18 the buzzer is turned on with a "Heart sound", the word "Heart" is spoken, and the New Task Heart lamp 5 is lit for ½ of a second.

Box 23 is a test to determine what type of CPR logic is to be executed. Exit A is followed for adult/one person CPR when 15 heart compressions cycles are required. Exit B is followed if Infant, Child or Adult/two person CPR is requested. These latter cases use 5 heart compression per ventilation cycle.

Assuming exit A was taken, Box 26 in FIG. 3 is the next step and involves a number of items. In box 26 all lights, buzzer, and voice are turned off because they may have been on if this step were called by the Restart 11 button. Next the bookkeeping logic flag called the "Exit Flag" is cleared. This flag is later used to ensure that a pulse is taken after the first minute and then not again except for every 2 minutes. Further a counter is initialized for counting the number of required compressions/ventilation cycles. Box 27 starts a 2 minute timer which is used to pace the final pulse measurement cycle. Box 28 cycles on the Current Task Heart light 4 on for 0.375 seconds. This is one half of the 0.75 second total cycle required to generate a compression cycle of 80 times per minute. Next box 29 asks the question: "Has 15 compressions been activated since the victim was ventilated?".

If the answer is no, then the last heart compression cycle is finished during the time interval needed to notify the rescuer that the next compression cycle is about to start. This is done in box 30. There the word "Heart" is spoken, the New Task Heart light 5 is lit and the buzzer is sounded if that option was selected by switch 10. Next box 20 again lights the Heart light for 1 second, and the cycle repeats.

When box 29 has counted 15 compression cycles the logic moves on to box 31 to notify the rescuer the new vent task about to begin. Box 31 lights the New Task Vent light 6, sounds the buzzer, and causes the word "Vent" to be spoken. Box 32 signals the actual ventilation occurence by cycling on and off the Current Vent light 3 for 1 second. This first of two ventilation cycles for the one person adult case is completed in box 33. Box 33 is identical to box 31 except that this time the buzzer is not sounded unless the "Buzz on all Lights" was selected via the Option Control switch 10. This is because in this case the task does not change from the prior task and so the normal buzz on change of task does not occur. Box 34 is also identical to box 32 in that the Current Vent light 3 is cycled. The final 1/2 second of this cycle; however, is completed in either boxes 39,40, or 48 depending on how the logic flows. Box 35 is logic bookkeeping to reset the compression counter so that the next time heart compressions are started, 15 compressions will occur before a ventilation cycle. Box 36 tests to see if the 2 minute timer initialized in box 27 has elapsed. If it has not then box 37 asks the question: "has 4 complete compression cycles been completed (57 seconds total time elapsed) since initialization in box 26?". If it has not, then it is not yet time to do a pulse check, and the logic goes to box 39 to complete the last vent cycle and start the next compression cycle. Box 39 turns on the buzzer, speaks the work "Heart", cycles the New Task Heart light 5 for ½ second, and then the compression cycle begins again in box 28. After 4 complete compression/ventilation cycles the logic in box 37 will exit not to box 39 but to box 38. When this happens the fist time, the logic in box 38 determines that the "Exit flag", cleared initially in box 26, is still clear (not set); therefore the logic flows to box 40. Box 40 to 46 represent the logic necessary to take the pulse and ventilate after the first minute of CPR. In box 40 the buzzer is sounded, the words "Pulse—check for breath" are spoken, and the New Task Pulse light 7 is lit for ½ second. In box 41 the Current Task Pulse light 2 is then lit for 4.5 seconds. That cycle is completed in box 42 where the New Task Vent light 6 is lit for ½ seconds, the buzzer is sounded and the word "Vent" spoken. This is part of a new procedure where a second ventilation is required after checking the pulse. Box 43 cycles the Current Vent light 3 for 1 second. Box 44 adds another ½ second to the ventilation process by cycling the New Task Vent light 6 for ½ second, and by simultaneously speaking the word "Vent", and buzzing again if that option was selected. Next box 45 cycles the Current Vent light 3 for one second. Box 46 completes the cycle by lighting the New Task Heart light 5, sounding the buzzer and speaking the word "Heart".

In box 47 the "Exit flag" that was tested in box 38 is now set. By this mechanism it is ensured that the logic in boxes 37 and 38 will no longer exit to box 40. After this first time taking the pulse, the logic flows to box 27 where the 2 minute timer is again reset. Next the heart compression cycle is restarted at box 28. After 15 more compressions and two ventilation cycles the logic in box 36 tests to determine if 2 minutes has elapsed. Initially 2 minutes will not have elapsed so box 37 then tests to see if four complete compression cycles have been completed. In this case we are on the fifth such cycle, so logic is box 38 is called which checks the "Exit flag". If is now set. Therefore, the logic flows to box 39 and heart compressions are again performed. This process repeats until two minutes has elapsed and the logic in box 36 exits to box 48. Boxes 48 to 54 are the same as the pulse logic described in boxes 40 to 46 and when this process is complete the logic exits to box 27. Box 27 causes the 2 minute timer to be reset. But note, the current count of compression sets is not changed back to zero as was done in box 28. Therefore, from now on, this process ensures that every 15 compressions two ventilations are performed and every 2 minutes a pulse checking procedure is performed.

The FIG. 3 logic initiated by exit A in FIG. 2 has now been completely reviewed. This logic for Adult/One Person CPR in FIG. 3 is very similar to the logic for Adult/Two Person CPR or Infant CPR or Child CPR in FIG. 4 with only a few exceptions. Exit B in FIG. 2 calls this latter logic. In this logic box 57 in FIG. 4 uses one of three different rates for the heart compression to support the three different rates needed for an adult, child, or infant. Also boxes 55, 58 and 62 allows only 5 compressions before a ventilation cycle is called. In FIG. 3 there are two ventilation events which occur after a cycle of heart compressions, while in FIG. 4 only one ventilation cycle occurs in boxes 60 and 61. Also after performing pulse checking in FIG. 3 an extra ventilation sequence exists that does not apply to FIG. 4. Note there are no ventilations in the steps between boxes 67 to 70 or from 71 to 73. Lastly a 1 minute timer has been introduced to provide for taking the pulse after the first minute. A fixed number of cycles can not be counted accurately since the compression rates vary for Infant, Child and Adult. This 1 minute timer is initialized in box 55 in place of setting the compression count previously done in box 26. In box 64 this timer is tested and performs the same function as the previously discussed compression count text did in box 37. Outside of these changes the logic is the same as that described for FIG. 3. Since this logic is under software program control changes to this procedure can be made and are expected since the CPR guidelines are redrawn about every six or seven years.

Going back to FIG. 2 boxes 19 to 22 are constantly active logic that could interrupt any of the processes just described. For instance if during a pulse checking interval the rescuer determines that the victim has a pulse, then the rescuer sets on the Pulse Detected switch 12. The logic in box 19 detects this occurrence and interrupts the process by routing the logic to box 24. Box 24 ensures that all lights and sounds associated with the interrupted process cease, and then starts a ventilation sequence by cycling lights 3 and 6 on and off together at a rate of 12 times per minute.

Box 20 is logic that tests the Option Control switch 10 to see if the buzzer signal is desired each time a current task is repeated. When this situation exists the buzzer is sounded where ever the situation exists. In the FIGS. 2,3,4, and 5 these points are identified by the phrase "Buzz if Option Selected".

Box 22 is the logic that constantly monitors the Restart button. If this button is pressed current processing ceases and the logic flows back to box 23—the start of the CPR process less the initialization procedures.

If the rescuer has help where a clear airway is assured, the asynchronous mode may be selected. If this occurs the process is interrupted at box 21 and logic flows to FIG. 5 via exit C. In the asynchronous mode in FIG. 5, two separate sets of tasks are being done simultaneously. That is, tasks in boxes 74 to 75 and 78 to 32 are occurring simultaneously. Boxes 74 and 75 are responsible for the ventilation logic, where the Current Task Vent light 3 and the New Task Vent light 6 are alternately cycled on and off at a rate of 13.5 times a minute. In this situation, each light is sequentially lit for 2.22 seconds giving a total rate of 4.44 seconds per cycle or 13.5 cycles per minute. Boxes 76 to 92 include all the various 5 compression CPR logic, without the ventilation cycles. Since this procedure requires two persons, only the 5 compression sequence logic is provided.

Figure 6:
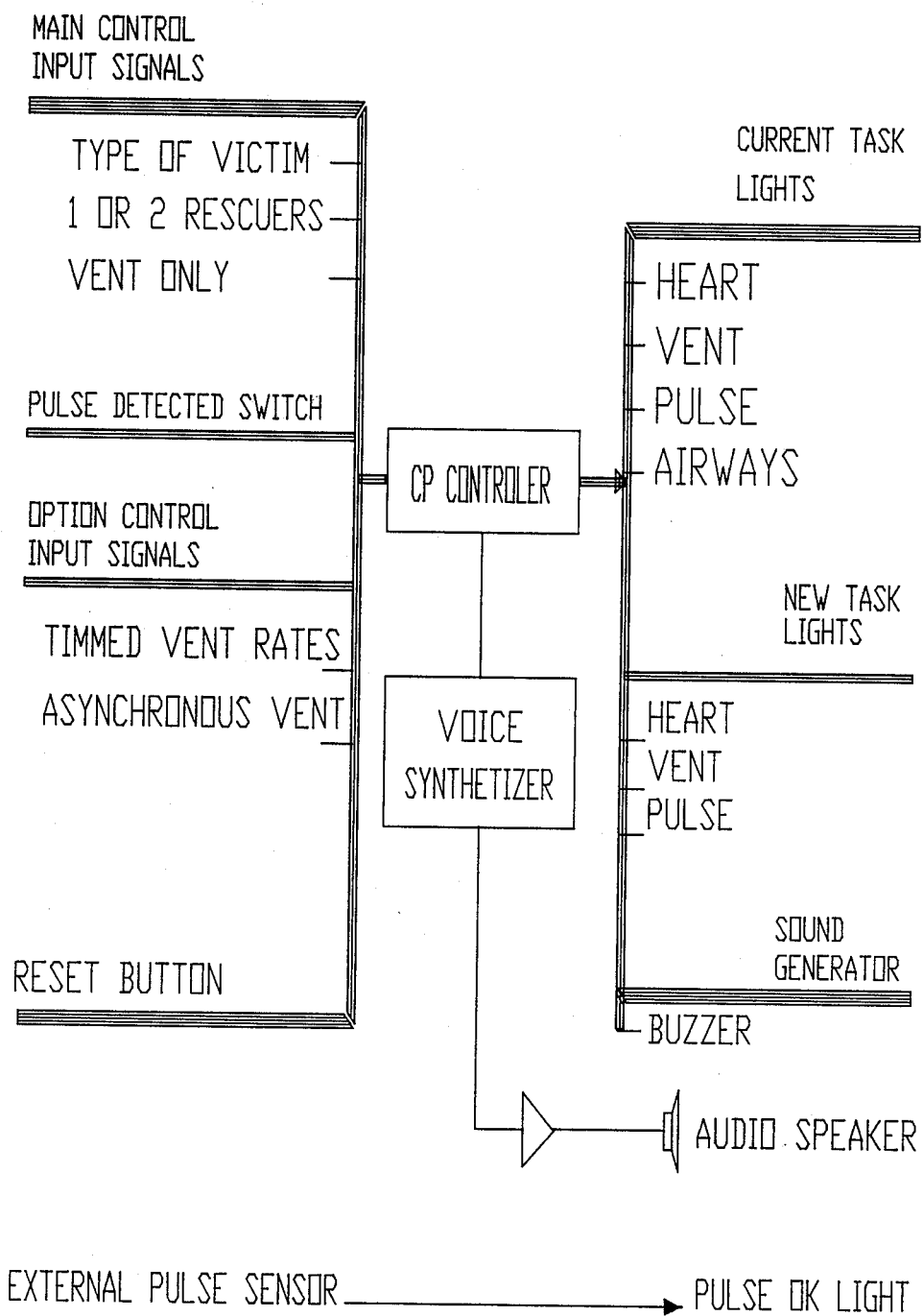
FIG. 6 is a block diagram of the microprocessor electronic control circuit needed to process the input of the switch controls and the output of the timed buzzer, light and synthesized voice signals.

The electronic aspect of this device is described in block format in FIG. 6. This Figures shows all of the input signals to the CP (control processor) and all of the output signals from the CP. The CP is a controller chip with internal RAM and ROM memory. A separate voice synthesizer chip is used to generate the voice, and that chip also has internal ROM memory for its vocabulary.

While the apparatus herein described is the preferred embodiment of the invention, it is to be understood that the invention is not limited to this precise form. Changes may be made, without departing from the basic invention.

What is claimed is:

1. A portable CPR sequencer, for use by a rescuer in assisting a victim, comprising:

an electronic logic system which provides timed tone/sound signals, and timed visual signals all of which are designed to indicate appropriate and properly spaced rescuer actions (clear airways, heart compression, ventilation with the CPR, pulse monitoring and ventilation after pulse is present) on the victim;

the means for making the rescuer aware of such signals without interfering with the rescuer's concentration on the victim;

a means with which the rescuer can cause the logic system and associated stimuli signals to operate with the following victim situations:

the victim is either an infant, child or adult;

there are either one or two rescuers;

ventilation signals will be synchronized with the heart compressions, ventilation signals will be asynchronous to the heart compressions and therefore be continuous so as not to stop during either the heart compression or pulse monitoring cycles;

a means with which the rescuer can choose to have a buzzer/tone sound each time an action (heart compression, ventilation or pulse) is required or only when a change from one type of action to another type of action is required.

2. The device of claim 1 also comprises: ventilation only logic that can be selected with the correct post CPR vetilation rate when a pulse is detected and the operator confirms/indicates to the system that a pulse is present.

3. The device of claim 1 also comprises: a means of accepting a pulse detector signal to allow for the visual conformation that chest compressions are effectively creating a pulse and as an independent pulse checking method to be monitored when the CPR sequence requires the pulse be taken.

4. The device of claim 1 also comprises: a means of producing correctly timed synthesized voice commands to direct the operator in performing all of the CPR functions.

5. A CPR sequencer device wherein timed signals to the rescuer for a given victim situation, including the victim being either an infant, child or adult and there are either one or two rescuers, include both a current task as well as an anticipatory next task indicator with a unique buzzer/tone sound for each task, and wherein each task corresponds to a rescuer action, thus assisting the rescuer in changing to the correct task in sequence.

6. A portable CPR sequencer for use by a rescuer in assisting a victim, comprising:
an electronic logic system which provides timed signals, all of which are designed to indicate appropriate and properly spaced rescuer actions on the victim with a means for resetting for a given victim situation, including the victim being either an infant, child or adult and there are either one or two rescuers the device's logic system to restart the heart compressions to allow the rescuer to get back in sync with the device.

* * * * *